US012788066B2

(12) United States Patent
Lu et al.

(10) Patent No.: US 12,788,066 B2
(45) Date of Patent: Nov. 10, 2026

(54) AEROSOL GENERATION DEVICE AND HEATER

(71) Applicant: SHENZHEN FIRST UNION TECHNOLOGY CO., LTD., Shenzhen City (CN)

(72) Inventors: Zhiming Lu, Shenzhen City (CN); Zhongli Xu, Shenzhen City (CN); Yonghai Li, Shenzhen City (CN)

(73) Assignee: SHENZHEN FIRST UNION TECHNOLOGY CO., LTD., Shenzhen City (CN)

( * ) Notice: Subject to any disclaimer, the term of this patent is extended or adjusted under 35 U.S.C. 154(b) by 464 days.

(21) Appl. No.: 18/553,566

(22) PCT Filed: Apr. 1, 2022

(86) PCT No.: PCT/CN2022/084863
§ 371 (c)(1),
(2) Date: Oct. 1, 2023

(87) PCT Pub. No.: WO2022/206966
PCT Pub. Date: Oct. 6, 2022

(65) Prior Publication Data

US 2024/0196978 A1 Jun. 20, 2024

(30) Foreign Application Priority Data

Apr. 1, 2021 (CN) ......................... 202110353146.4

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/20* (2020.01); *A24F 40/50* (2020.01); *A24F 40/51* (2020.01);
(Continued)

(58) Field of Classification Search
None
See application file for complete search history.

(56) References Cited

U.S. PATENT DOCUMENTS 7,415,198 B2 * 8/2008 Lin ........................ H05B 3/009 392/407
2007/0062931 A1 * 3/2007 Lin .......................... H05B 3/78 219/481
2007/0170166 A1 7/2007 Lin

FOREIGN PATENT DOCUMENTS

CN 203952435 U 11/2014
CN 204579893 U 8/2015
(Continued)

OTHER PUBLICATIONS

English machine translation of CN 108308725 A; Chen et al.; A24F47/00; 14 pages; published Jul. 24, 2018. (Year: 2018).*
(Continued)

*Primary Examiner* — Linda L Gray
(74) *Attorney, Agent, or Firm* — Scully, Scott, Murphy & Presser, P.C.

(57) ABSTRACT

An aerosol generation device includes a chamber, a heater, and a core. The heater includes: an elongated base body, having a proximal end, a distal end, and a closed space formed inside the base body, where the proximal end is to be inserted into an aerosol-forming substrate received in the chamber; and the closed space is filled with a working gas; and a first electrode and a second electrode spaced apart from each other, where the first and second electrodes are both partially accommodated in the closed space and extend
(Continued)

from the closed space to outside of the base body. The first and second electrodes are configured to receive electric power provided by the core to generate an electric field between the first and second electrodes. The working gas is ionized to form a plasma under an action of the electric field to generate heat, to heat the aerosol-forming substrate.

11 Claims, 6 Drawing Sheets

(51) Int. Cl.

| | |
|---|---|
| ***A24F 40/50*** | (2020.01) |
| ***A24F 40/51*** | (2020.01) |
| ***A24F 40/57*** | (2020.01) |
| ***A24F 42/60*** | (2020.01) |
| ***H05B 3/03*** | (2006.01) |
| ***H05B 3/24*** | (2006.01) |
| ***H05B 3/40*** | (2006.01) |
| ***H05B 3/42*** | (2006.01) |
| ***H05B 6/00*** | (2006.01) |
| ***H05B 6/54*** | (2006.01) |
| ***H05B 7/07*** | (2006.01) |

(52) U.S. Cl.
CPC .............. *A24F 40/57* (2020.01); *A24F 42/60* (2020.01); *H05B 3/03* (2013.01); *H05B 3/40* (2013.01); *H05B 3/42* (2013.01); *H05B 6/00* (2013.01); *H05B 6/54* (2013.01); *H05B 7/07* (2013.01)

(56) References Cited

FOREIGN PATENT DOCUMENTS

| | | | | | |
|---|---|---|---|---|---|
| CN | 108308725 A | | 7/2018 | | |
| CN | 208540742 U | | 2/2019 | | |
| CN | 111109669 A | | 5/2020 | | |
| KR | 20090002978 U | * | 3/2009 | ............. | F24H 1/202 |
| KR | 20120033509 A | * | 4/2012 | ........... | F24H 9/1818 |

OTHER PUBLICATIONS

English machine translation of CN 113811211 A; Sayed et al.; published Dec. 17, 2021; A24F40/50; 271 pages. (Year: 2021).*
Chinese Office Action dated Mar. 5, 2026 received in Chinese Application No. 202110353146.4.

* cited by examiner

AEROSOL GENERATION DEVICE AND HEATER

CROSS-REFERENCE TO RELATED APPLICATIONS

This application is a 35 U.S.C. § 371 National Phase conversion of International (PCT) Patent Application No. PCT/CN2022/084863, filed on Apr. 1, 2022, which claims priority to Chinese Patent Application 202110353146.4, filed with the China National Intellectual Property Administration on Apr. 1, 2021 and entitled "AEROSOL GENERATION DEVICE AND HEATER", which is incorporated herein by reference in its entirety. The PCT International Patent Application was filed and published in Chinese.

TECHNICAL FIELD

This application relates to the technical field of cigarette devices, and in particular, to an aerosol generation device and a heater.

BACKGROUND

During use of smoking objects such as a cigarette or a cigar, tobaccos are burnt to generate vapor. A product that releases compounds without burning has been tried to provide an alternative for the objects that burn the tobaccos. An example of the products is a heat-not-burn product, which releases compounds by heating the tobaccos rather than burning the tobaccos.

The existing aerosol generation device uses a ceramic base body to heat a cigarette. Specifically, a heating wire is arranged in a ceramic tube. After the heating wire is energized, heat generated is conducted to the ceramic tube, and the ceramic tube further heats the cigarette. The aerosol generation device has the following problems: a poor heating effect of the ceramic base body, insufficient release of components in the cigarette, and poor inhaling experience of users.

SUMMARY

This application provides an aerosol generation device and a heater, to resolve the problem of poor heating effect of a ceramic base body in the existing aerosol generation device.

According to an aspect, this application provides an aerosol generation device, including a chamber, a heater, and a core.

The heater includes:

an elongated base body, having a proximal end, a distal end, and a closed space formed inside the base body, where the proximal end is configured to be inserted into an aerosol-forming substrate received in the chamber, and the closed space is filled with a working gas; and a first electrode and a second electrode spaced apart from each other, where the first electrode and the second electrode are both partially accommodated in the closed space and extend from the closed space to outside of the base body, and the first electrode and the second electrode are configured to receive electric power provided by the core to generate an electric field between the first electrode and the second electrode; and the working gas is ionized to form a plasma under an action of the electric field to generate heat to heat the aerosol-forming substrate.

In an optional implementation, the first electrode and the second electrode each have a first end and a second end opposite to the first end; and the first electrode and the second electrode both extend from the distal end of the base body to the proximal end, and the first end stops in the closed space to form a free end, and the second end is exposed outside the base body at the distal end of the base body.

In an optional implementation, a part of the first electrode and a part of the second electrode accommodated in the closed space are arranged substantially in parallel.

In an optional implementation, the part of the first electrode has at least one first surface facing the part of the second electrode, and the at least one first surface is constructed as a blade or as a rough surface; and/or the part of the second electrode has at least one second surface facing the part of the first electrode, and the at least one second surface is constructed as a blade or as a rough surface.

In an optional implementation, a first end of the first electrode and a first end of the second electrode are both in the shape of a needle.

In an optional implementation, lengths of the part of the first electrode and the part of the second electrode are both between one-half and two-thirds of a length dimension of the base body.

In an optional implementation, the first electrode and the second electrode are both made of a high-temperature resistant metal material, and the high-temperature resistant metal material is selected from at least one of the following: tungsten, molybdenum, tantalum, niobium, vanadium, chromium, titanium, and zirconium.

In an optional implementation, the base body is made of a high-temperature resistant and transparent material to transfer the heat to the aerosol-forming substrate by conduction and/or radiation.

In an optional implementation, the high-temperature resistant and transparent material includes at least one of quartz, ceramic, and mica.

In an optional implementation, the working gas includes a rare gas with an air pressure in a range of 1000 Pa to one atmosphere.

In an optional implementation, the aerosol generation device further includes a temperature sensor configured to detect a temperature of the heater, where the temperature sensor is held on the base body.

According to another aspect, this application provides a heater for an aerosol generation device, and the heater includes:

an elongated base body, having a proximal end, a distal end, and a closed space formed inside the base body, where the closed space is filled with a working gas; and a first electrode and a second electrode spaced apart from each other, where the first electrode and the second electrode are both partially accommodated in the closed space and extend from the closed space to outside of the base body, and the first electrode and the second electrode are configured to receive electric power to generate an electric field between the first electrode and the second electrode; and the working gas is ionized to form a plasma under an action of the electric field to generate heat.

Through the aerosol generation device and the heater provided by this application, a plasma is formed through ionization to generate heat to heat the aerosol-forming substrate. In this way, a cigarette can be effectively heated, so that components in the cigarette can be fully released, thereby improving inhalation experience of users.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding of this application, this application is described below in more detail with reference to the accompanying drawings and specific implementations. It should be noted that when an element is expressed as "being fixed to" another element, the element may be directly on the another element, or one or more intermediate elements may exist between the element and the another element. When one element is expressed as "being connected to" another element, the element may be directly connected to the another element, or one or more intermediate elements may exist between the element and the another element. The terms "upper", "lower", "left", "right", "inner", "outer", and similar expressions used in this specification are merely used for an illustrative purpose.

Unless otherwise defined, meanings of all technical and scientific terms used in this specification are the same as that usually understood by a person skilled in the technical field to which this application belongs. The terms used in this specification of this application are merely intended to describe objectives of the specific implementations, and are not intended to limit this application. A term "and/or" used in this specification includes any or all combinations of one or more related listed items.

Figure 1:
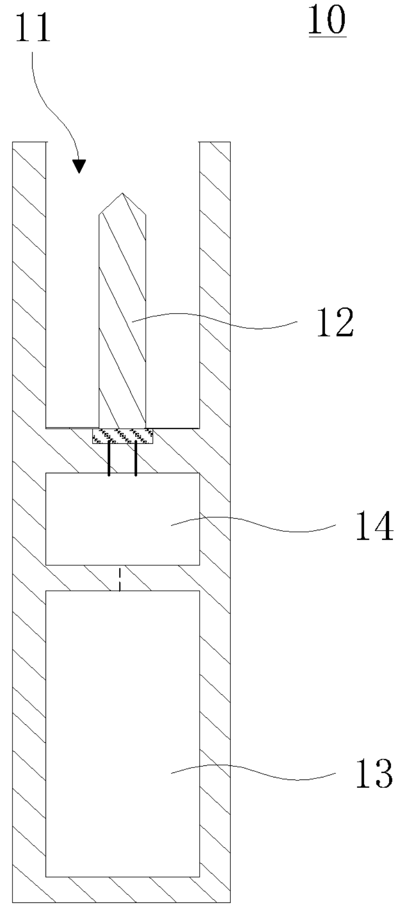
FIG. 1 is a schematic diagram of an aerosol generation device according to an implementation of this application.
Figure 2:
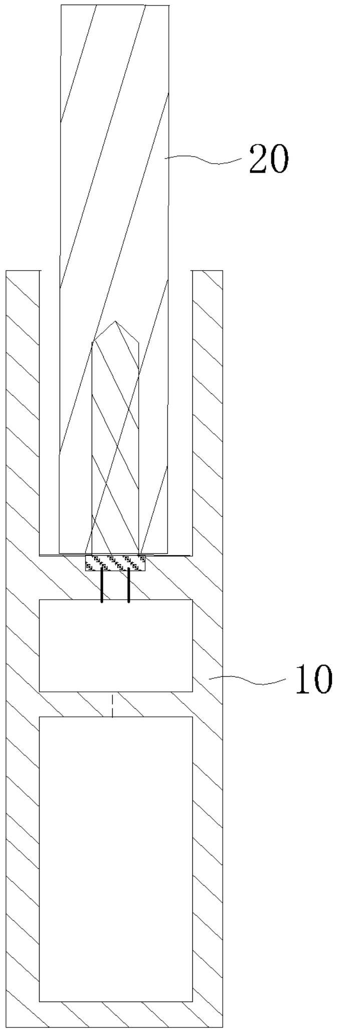
FIG. 2 is a schematic diagram of an aerosol generation device after inserting a cigarette according to an implementation of this application.

FIG. 1 and FIG. 2 show an aerosol generation device 10 according to an implementation of this application, and the device includes: a chamber 11, a heater 12, and a core 13, and a circuit 14. The chamber 11 is configured to receive an aerosol-forming substrate. It may be understood that the aerosol-forming substrate may be a part of an aerosol generation product 20.

The aerosol-forming substrate is a substrate that can release volatile compounds forming an aerosol. The volatile compound may be released by heating the aerosol-forming substrate. The aerosol-forming substrate may be solid, liquid, or components including solid and liquid. The aerosol-forming substrate may be loaded onto a carrier or a support through adsorbing, coating, impregnating, or in other manners.

The aerosol-forming substrate may include nicotine. The aerosol-forming substrate may include tobaccos, for example, may include a tobacco-contained material including volatile tobacco-aroma compounds, and the volatile tobacco-aroma compounds are released from the aerosol-forming substrate when the aerosol-forming substrate is heated. Preferably, the preferred aerosol-forming substrate may include a homogeneous tobacco material. The aerosol-forming substrate may include at least one aerosol-forming agent, and the aerosol-forming agent may be any suitable known compound or a mixture of compounds. During use, the compound or the mixture of compounds facilitates to compact and stabilize formation of the aerosol and is substantially resistant to thermal degradation at an operating temperature of an aerosol-forming system. Suitable aerosol-forming agents are well known in the related art and include, but are not limited to: polyol, such as triethylene glycol, 1,3-butanediol, and glycerol; polyol ester, such as glycerol acetate, glycerol diacetate, or glycerol triacetate; and fatty acid ester of monobasic carboxylic acid, dibasic carboxylic acid, or polybasic carboxylic acid, such as dimethyl dodecane dibasic ester and dimethyl tetradecane dibasic ester. Preferably, the aerosol forming agent is polyhydric alcohols or a mixture thereof, such as triethylene glycol, 1,3-butanediol, or most preferably, glycerol.

The heater 12 is construed to be inserted into the aerosol-forming substrate received in the chamber 11, to heat the aerosol-forming substrate received in the chamber 11.

The core 13 supplies power for operating the aerosol generation device 10. For example, the core 13 may supply power to heat the heater 12. In addition, the core 13 may supply power for operating other components provided in the aerosol generation device 10. The core 13 may be a rechargeable battery or a disposable battery.

The circuit 14 may control overall operations of the aerosol generation device 10. The circuit 14 not only controls operations of the core 13 and the heater 12, but also controls operations of other components in the aerosol generation device 10. For example, the circuit 14 obtains temperature information of the heater 12 that is sensed by a temperature sensor 15, and controls, based on the information, power supplied to the heater 12 by the core 13.

Figure 3:
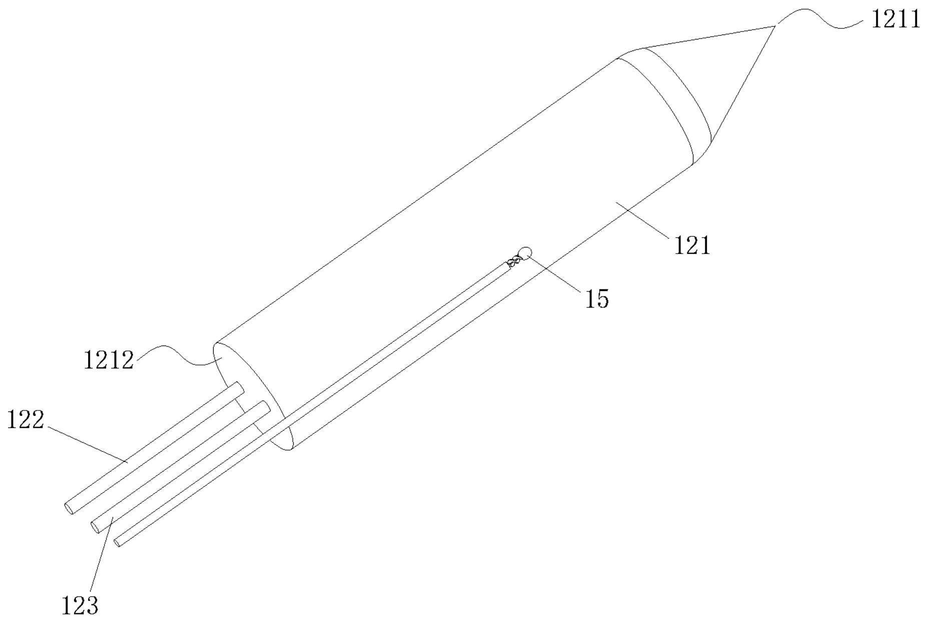
FIG. 3 is a schematic diagram of a heater according to an implementation of this application.
Figure 4:
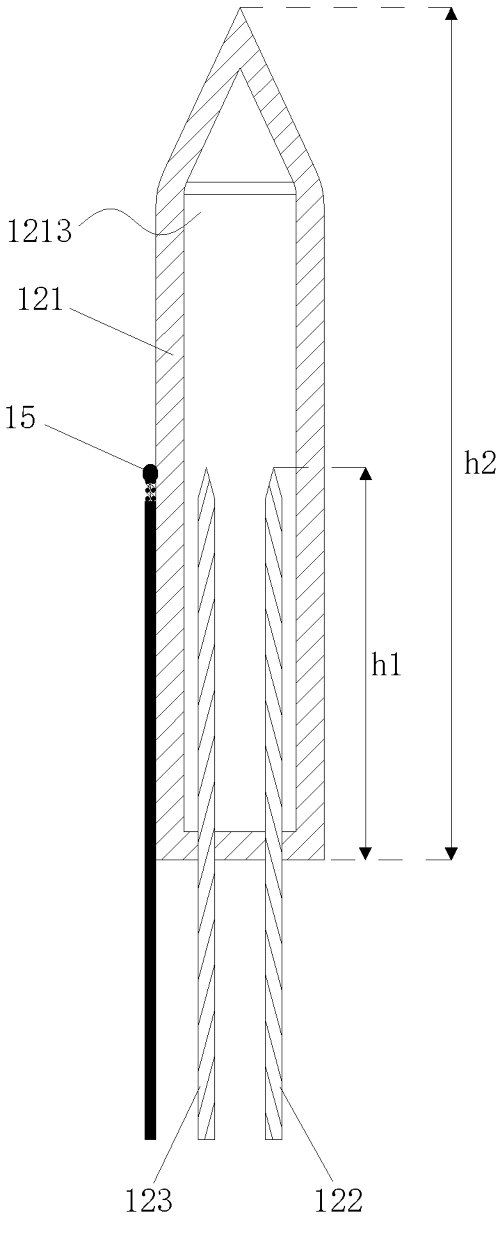
FIG. 4 is a schematic cross-sectional view of a heater according to an implementation of this application.

FIG. 3 and FIG. 4 show a heater according to an implementation of this application. The heater 12 includes an elongated base body 121 and a conductive element. A part of the conductive element is accommodated inside the base body 121, and another part of the conductive element extends from inside of the base body 121 to outside of the base body 121. In this example, the base body 121 has a proximal end 1211, a distal end 1212, and a closed space 1213 formed inside the base body 121.

The base body 121 extends longitudinally from the proximal end 1211 to the distal end 1212, and is generally rod-shaped or columnar, preferably cylindrical. The proximal end 1211 protrudes to be in a conical shape and is configured to be conveniently insert into the aerosol-forming substrate. The temperature sensor 15 is held on an outer surface of the base body 121, and the holding manner is not limited here, and reference can be made to the prior art. For example, the temperature sensor can be fixed to the outer surface of the base body 121 by a high-temperature resistant adhesive material.

The base body 121 is made of a material with good thermal conductivity and high-temperature resistance. Preferably, the base body 121 is made of a high-temperature resistant and transparent material to transfer the heat to the aerosol-forming substrate by conduction and/or radiation. Specifically, the high-temperature resistant and transparent material includes but is not limited to quartz, ceramic, and mica. In this example, the base body 121 is made of a quartz material. The quartz material has low surface free energy, and residue does not easily adhere to an outer surface of the quartz glass, so that the quartz glass is easy to clean.

The closed space 1213 is filled with a working gas. The working gas may be a mixed gas or a non-mixed gas. In this example, the working gas includes a rare gas with an air pressure in a range of 1000 Pa to one atmosphere, for example, Neon (Ne), argon (Ar), and the like.

The conductive element includes a first electrode 122 and a second electrode 123 spaced apart from each other. The first electrode 122 and the second electrode 123 are both made of a high-temperature resistant metal material, and the high-temperature resistant metal material includes but is not limited to tungsten, molybdenum, tantalum, niobium, vanadium, chromium, titanium, zirconium, and the like.

The first electrode 122 and the second electrode 123 are both partially accommodated in the closed space 1213 and extend from the closed space 1213 to outside of the base body 121. Specifically, the first electrode 122 and the second electrode 123 each have a first end and a second end opposite to the first end. The first electrode 122 and the second electrode 123 both extend from the distal end of the base body 121 to the proximal end, and the first end of the first electrode 122 and the first end of the second electrode 123 stops in the closed space 1213 to form a free end. Both the second end of the first electrode 122 and the second end of the second electrode 123 are exposed outside the base body 121 at the distal end of the base body 121.

The second end of the first electrode 122 and the second end of the second electrode 123 are configured to couple the core 13. Under an action of electric power provided by the core 13, an electric field is generated between the first electrode 122 and the second electrode 123. The working gas filled in the closed space 1213 can be ionized to form a plasma under an action of the electric field to generate heat, and then heat the aerosol-forming substrate by conduction and/or radiation.

Still referring to FIG. 4, in order to increase an electric field strength between the first electrode 122 and the second electrode 123, the first end of the first electrode 122 and the first end of the second electrode 123 are both in the shape of a needle. In this way, the charge at a needle tip can be particularly dense, the electric field strength in the vicinity thereof can be increased, and the working gas filled in the closed space 1213 can be ionized more conveniently.

Further, length of the part of the first electrode 122 and the part of the second electrode 123 accommodated in the closed space 1213 is between one-half and two-thirds of a length dimension of the base body 121. The first electrode 122 is used as an example. A length of the part the first electrode 122 accommodated in the closed space 1213 is h1, a length of the base body 121 is h2, where h1 is between about one-half and two-thirds of h2. In this way, when the working gas filled in the closed space 1213 is ionized by a strong electric field at the needle tip, the heat is mainly concentrated at the proximal end of the base body 121, and then the aerosol-forming substrate at the proximal end of the base body 121 is heated to improve heating rate and user experience.

Figure 5:
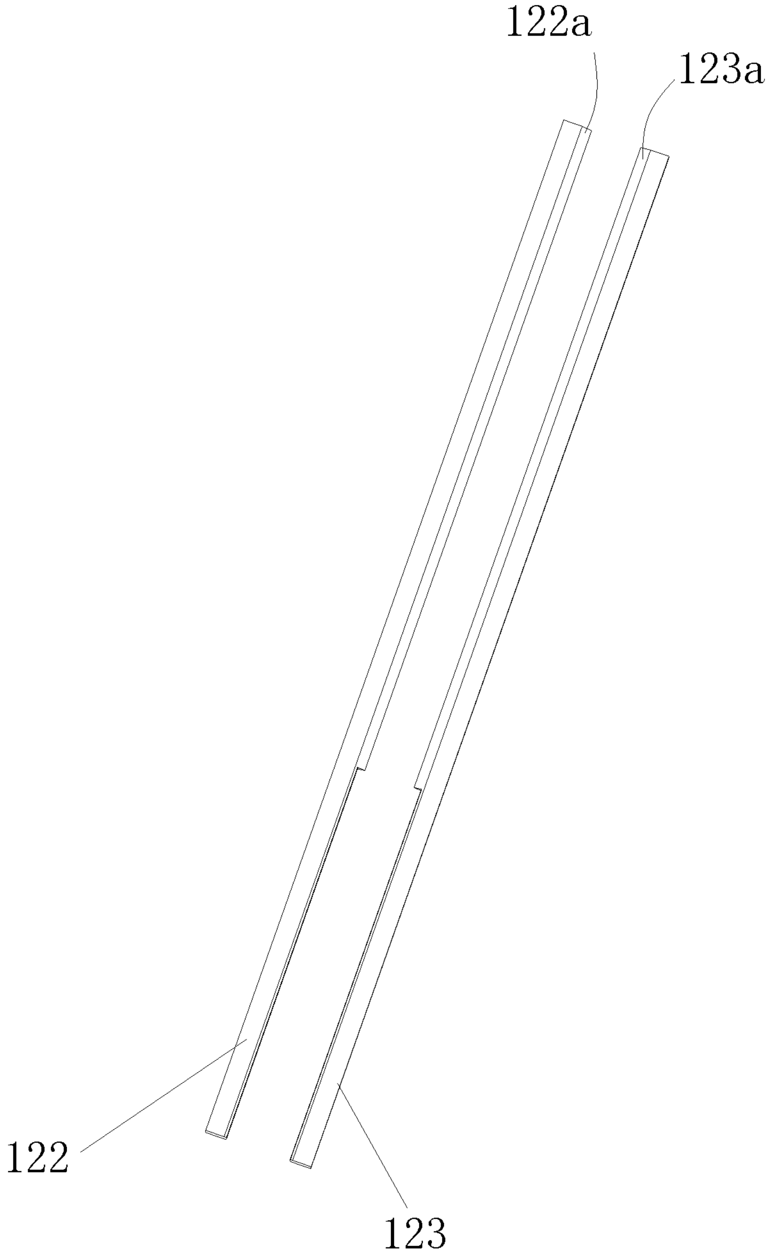
FIG. 5 is a schematic diagram of another conductive element in a heater according to an implementation of this application.

Referring to FIG. 5, in another example, a part of the first electrode 122 and a part of the second electrode 123 accommodated in the closed space 1213 are arranged substantially in parallel. The part of the first electrode 122 and the part of the second electrode 123 arranged substantially in parallel facilitates generation of a substantially uniform electric field between the first electrode 122 and the second electrode 123. The working gas filled in the closed space 1213 can be ionized to form a plasma under an action of this uniform electric field to generate heat. Further, in this example, in order to increase the electric field strength between the first electrode 122 and the second electrode 123, a surface 122*a* of part of the first electrode 122 facing part of the second electrode 123 is a blade, and a surface 123*a* of part of the second electrode 123 facing part of the first electrode 122 is also a blade. In this way, the working gas filled in the closed space 1213 is rapidly ionized by a strong electric field between the blade-shaped surfaces. The number of surfaces 122*a* of the first electrode 122 or the surfaces 123*a* of the second electrode 123 is not limited here.

Figure 6:
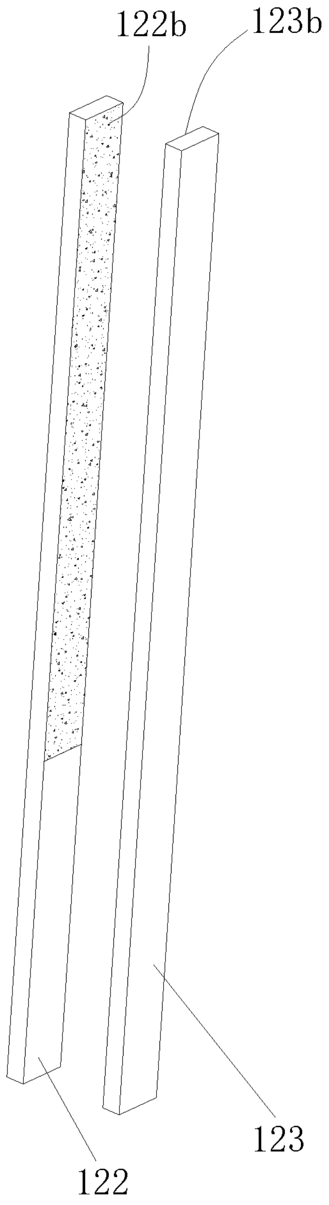
FIG. 6 is a schematic diagram of still another conductive element in a heater according to an implementation of this application.

Referring to FIG. 6, in still another example, a part of the first electrode 122 and a part of the second electrode 123 accommodated in the closed space 1213 are arranged substantially in parallel. In order to increase the electric field strength between the first electrode 122 and the second electrode 123, a surface 122*b* of part of the first electrode 122 facing part of the second electrode 123 is a rough surface, and a surface 123*b* of part of the second electrode 123 facing part of the first electrode 122 is also a rough surface. The rough surface may be an irregular rough surface, which may be formed by a conventional machining method, for example, prepared by mechanical polishing or chemical etching or laser ablation. In this way, the working gas filled in the closed space 1213 is rapidly ionized by a strong electric field between the rough surfaces.

It should be noted that the term "substantially" is used for describing and explaining small changes. When used in conjunction with an event or a circumstance, the terms can refer to instances in which the event or circumstance occurs precisely as well as instances in which the event or circumstance occurs to a close approximation. For example, "substantially" parallel may refer to a range of angular variation less than or equal to #10° with respect to 0°, for example, less than or equal to +5°, less than or equal to +4°, less than or equal to +3°, less than or equal to #2°, less than or equal to #1°, less than or equal to +0.5°, less than or equal to #0.1°, or less than or equal to =0.05°.

It should be noted that the specification of this application and the accompanying drawings thereof illustrate preferred embodiments of this application. However, this application may be implemented in various forms, and is not limited to the embodiments described in this specification. These embodiments are not intended to be an additional limitation on the content of this application, and are described for the purpose of providing a more thorough and comprehensive understanding of the content disclosed in this application. Moreover, the foregoing technical features are further combined to form various embodiments not listed above, and all such embodiments shall be construed as falling within the scope of this application. Further, a person of ordinary skill in the art may make improvements or modifications according to the foregoing descriptions, and all the improvements and modifications shall fall within the protection scope of the appended claims of this application.

What is claimed is:

1. An aerosol generation device, comprising a chamber, a heater, and a core;

wherein the heater comprises:

an elongated base body, having a proximal end, a distal end, and a closed space formed inside the base body, wherein the proximal end is configured to be inserted into an aerosol-forming substrate received in the chamber, and the closed space is filled with a working gas; and a first electrode and a second electrode spaced apart from each other, wherein the first electrode and the second electrode are both partially accommodated in the closed space and extend from the closed space to outside of the base body, and the first electrode and the second electrode are configured to receive electric power provided by the core to generate an electric field between the first electrode and the second electrode; and the working gas is ionized to form a plasma under an action of the electric field to generate heat to heat the aerosol-forming substrate.

2. The aerosol generation device according to claim 1, wherein the first electrode and the second electrode each have a first end and a second end opposite to the first end; and the first electrode and the second electrode both extend from the distal end of the base body to the proximal end, and the first end stops in the closed space to form a free end, and the second end is exposed outside the base body at the distal end of the base body.

3. The aerosol generation device according to claim 2, wherein a part of the first electrode and a part of the second electrode accommodated in the closed space are arranged substantially in parallel.

4. The aerosol generation device according to claim 3, wherein the part of the first electrode has at least one first surface facing the part of the second electrode, and the at least one first surface is constructed as a blade or as a rough surface; and/or the part of the second electrode has at least one second surface facing the part of the first electrode, and the at least one second surface is constructed as a blade or as a rough surface.

5. The aerosol generation device according to claim 2, wherein the first end of the first electrode and the first end of the second electrode are both in the shape of a needle.

6. The aerosol generation device according to claim 5, wherein lengths of the part of the first electrode and the part of the second electrode are both between one-half and two-thirds of a length dimension of the base body.

7. The aerosol generation device according to claim 1, wherein the first electrode and the second electrode are both made of a high-temperature resistant metal material, and the high-temperature resistant metal material is selected from at least one of the following: tungsten, molybdenum, tantalum, niobium, vanadium, chromium, titanium, and zirconium.

8. The aerosol generation device according to claim 1, wherein the base body is made of a high-temperature resistant and transparent material to transfer the heat to the aerosol-forming substrate by conduction and/or radiation.

9. The aerosol generation device according to claim 8, wherein the high-temperature resistant and transparent material comprises at least one of quartz, ceramic, and mica.

10. The aerosol generation device according to claim 1, wherein the working gas comprises a rare gas with an air pressure in a range of 1000 Pa to one atmosphere.

11. The aerosol generation device according to claim 1, further comprising a temperature sensor configured to detect a temperature of the heater, wherein the temperature sensor is held on the base body.

* * * * *